United States Patent
Sung et al.

(10) Patent No.: US 12,057,550 B2
(45) Date of Patent: Aug. 6, 2024

(54) SULFIDE-BASED SOLID ELECTROLYTE AND PREPARATION METHOD THEREOF

(71) Applicants: Hyundai Motor Company, Seoul (KR); Kia Corporation, Seoul (KR)

(72) Inventors: Ju Young Sung, Hwaseong-si (KR); Ho Taek Lee, Seoul (KR); Jae Min Lim, Suwon-si (KR); Yong Jun Jang, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 559 days.

(21) Appl. No.: 17/354,030

(22) Filed: Jun. 22, 2021

(65) Prior Publication Data

US 2022/0109181 A1  Apr. 7, 2022

Related U.S. Application Data

(62) Division of application No. 15/482,785, filed on Apr. 9, 2017, now Pat. No. 11,063,291.

(30) Foreign Application Priority Data

Nov. 22, 2016 (KR) .......................... 10-2016-0156040

(51) Int. Cl.
*H01M 10/0562* (2010.01)
*C04B 35/547* (2006.01)
(Continued)

(52) U.S. Cl.
CPC ....... *H01M 10/0562* (2013.01); *C04B 35/547* (2013.01); *C04B 35/6261* (2013.01);
(Continued)

(58) Field of Classification Search
CPC ........... H01M 10/0562; H01M 10/052; H01M 10/0525
See application file for complete search history.

(56) References Cited

U.S. PATENT DOCUMENTS

2014/0193693 A1   7/2014 Hoshina et al.
2015/0162614 A1   6/2015 Koshika et al.
(Continued)

FOREIGN PATENT DOCUMENTS

CN   104380508 A    2/2015
DE   112014002991 T5   3/2016
(Continued)

OTHER PUBLICATIONS

C. Julien, et al., "Ionic transport in LixNiPS3", Indo-French Centre for the Promotion of Advanced Research (IFCPAR), vol. 1, No. 5, Dec. 1994, pp. 211-217.
Mizuno, F. et al., "High lithim ion conducting glass-ceramic in the system Li2S—P2S5," Science Direct, Solid State Ionics 177, Apr. 2009, pp. 2721-2725.

*Primary Examiner* — Olatunji A Godo
(74) *Attorney, Agent, or Firm* — Slater Matsil, LLP (57) ABSTRACT

A sulfide-based solid electrolyte contains a nickel (Ni) element and a halogen element. For example, a sulfide-based solid electrolyte can include, with respect to 100 parts by mole of a mixture of lithium sulfide ($Li_2S$) and diphosphorus pentasulfide ($P_2S_5$), 5 parts by mole to 20 parts by mole of nickel sulfide ($Ni_3S_2$), and 5 parts by mole to 40 parts by mole of lithium halide.

20 Claims, 3 Drawing Sheets

(51) Int. Cl.
    *C04B 35/626*     (2006.01)
    *C04B 35/64*     (2006.01)
    *H01B 1/10*     (2006.01)
    *H01M 10/052*     (2010.01)
    *H01M 10/0525*     (2010.01)

(52) U.S. Cl.
    CPC .......... *C04B 35/6264* (2013.01); *C04B 35/64* (2013.01); *H01B 1/10* (2013.01); *H01M 10/052* (2013.01); *H01M 10/0525* (2013.01); *C04B 2235/446* (2013.01); *C04B 2235/6567* (2013.01); *C04B 2235/762* (2013.01); *H01M 2300/0068* (2013.01); *H01M 2300/008* (2013.01); *Y02T 10/70* (2013.01)

(56) References Cited

U.S. PATENT DOCUMENTS

| | | | |
|---|---|---|---|
| 2016/0248082 A1 | 8/2016 | Yersak et al. | |
| 2017/0187066 A1* | 6/2017 | Tsujimura | H01M 10/0562 |

FOREIGN PATENT DOCUMENTS

| | | |
|---|---|---|
| EP | 2779298 A1 | 9/2014 |
| EP | 3026749 A1 | 6/2016 |
| JP | 2001006674 A | 1/2001 |
| JP | 2016058142 | 4/2016 |
| KR | 20150132265 A | 11/2015 |
| WO | 2013136524 A1 | 9/2013 |
| WO | 2015076935 A2 | 5/2015 |

\* cited by examiner

SULFIDE-BASED SOLID ELECTROLYTE AND PREPARATION METHOD THEREOF

CROSS-REFERENCE TO RELATED APPLICATIONS

This application is a divisional of U.S. patent application Ser. No. 15/482,785, filed on Apr. 9, 2017, which claims priority to Korean Patent Application No. 10-2016-0156040 filed on Nov. 22, 2016, the entire contents of which are incorporated herein by reference.

TECHNICAL FIELD

The present disclosure relates to a sulfide-based solid electrolyte and a preparation method thereof.

BACKGROUND

Today, secondary batteries have been widely used from large devices such as a vehicle and a power storage system to small devices such as a mobile phone, a camcorder, and a laptop.

As the secondary battery is widely used and applied, the demand for improved safety and high performance of the battery has been increased.

A lithium secondary battery which is one of the secondary batteries has an advantage that energy density is higher and a capacity per unit area is larger than a nickel-manganese battery or a nickel-cadmium battery.

However, most of the electrolytes used in the lithium secondary batteries in the related art are liquid electrolytes such as organic solvents. Accordingly, safety problems such as leakage of electrolytes and the risk of fire resulting therefrom have been constantly raised.

As a result, recently, to increase safety, an interest in all-solid-state batteries using solid electrolytes rather than liquid electrolytes as the electrolytes has been increased.

The solid electrolyte has higher safety than the liquid electrolyte due to a non-combustible or flame-retardant property.

The solid electrolytes are divided into an oxide-based electrolyte and a sulfide-based electrolyte. The sulfide-based solid electrolyte has high lithium-ionic conductivity compared to the oxide-based solid electrolyte and is stable in a wide voltage range and thus the sulfide-based solid electrolyte is frequently used.

In Mizuno et al., high lithium ion conducting glass-ceramics in the system $Li_2S$-$P_2S_5$, Solid State Ionics, 177 (2006), 2721-2725 (hereinafter, referred to as 'non-patent document'), there is provided an amorphous solid electrolyte such as $70Li_2S$-$30P_2S_5$ and $80Li_2S$-$20P_2S_5$ among the sulfide-based solid electrolytes. According to the non-patent document, the amorphous solid electrolyte has ion conductivity at $1\times10^3$ S/cm at the time of heat-treating (crystallizing) at a relatively low temperature of 200° C. to 300° C., whereas the amorphous solid electrolyte has ion conductivity at $1\times10^{-3}$ S/cm at the temperature or higher.

In Korean Patent Application Publication No. 10-2015-0132265 (hereinafter, referred to as 'patent document'), there is provided a crystalline solid electrolyte such as $Li_6PS_5Cl$ among sulfide-based solid electrolytes. According to the patent document, the crystalline solid electrolyte has ion conductivity at $1\times10^{-3}$ S/cm at the time of heat-treating (crystallizing) at a temperature of about 500° C., whereas the crystalline solid electrolyte has ion conductivity at $1\times10^{-4}$ S/cm at the temperature or less.

As described in non-patent documents and the patent document, there is a limitation that the sulfide-based solid electrolyte in the related art has high ion conductivity only in a predetermined temperature range of either a low temperature (about 250° C.) or a high temperature (about 500° C.).

The above information disclosed in this Background section is only for enhancement of understanding of the background of the invention and therefore it may contain information that does not form the prior art that is already known in this country to a person of ordinary skill in the art.

SUMMARY

Embodiments of the present disclosure relates to a sulfide-based solid electrolyte having high ion conductivity in a wide crystallization temperature range, as a sulfide-based solid electrolyte containing a nickel (Ni) element and a halogen element.

Embodiments of the present invention can overcome the limitation of a sulfide-based solid electrolyte in the related art and provide a sulfide-based solid electrolyte having high ion conductivity in a wide crystallization temperature range and a preparing method thereof.

The present invention may include a number configurations in order to achieve advantages, for example, solving above-described problems associated with the prior art.

In one aspect, the present invention provides a sulfide-based solid electrolyte including 5 parts by mole to 20 parts by mole of nickel sulfide ($Ni_3S_2$) and 5 parts by mole to 40 parts by mole of lithium halide with respect to 100 parts by mole of a mixture of lithium sulfide ($Li_2S$) and diphosphorus pentasulfide ($P_2S_5$).

In a preferred embodiment, the mixture may include 60 mole % to 90 mole % of lithium sulfide and 10 mole % to 40 mole % of diphosphorus pentasulfide.

In another preferred embodiment, the lithium halide may be expressed by LiX (X is Cl, Br or I).

In still another preferred embodiment, the crystallization temperature may be 200° C. to 400° C. and the sulfide-based solid electrolyte may have a cubic crystal structure.

In yet another preferred embodiment, the crystallization temperature may be 400° C. to 600° C. and the sulfide-based solid electrolyte may have a cubic crystal structure.

In still yet another preferred embodiment, the cubic crystal structure may have diffraction peaks in an a area of diffraction angles 2θ of 15.5±0.5°, 18±0.5°, 25.5±0.5°, 30±0.5°, 31.5±0.5°, 40±0.5°, 45.5±0.5°, 48±0.5°, 53±0.5°, 55±0.5°, 56.5±0.5° and 59.5±0.5° in an X-ray diffraction spectrum.

In another aspect, the present invention provides a method of preparing a sulfide-based solid electrolyte including: (1) preparing a starting material by adding 5 parts by mole to 20 parts by mole of nickel sulfide ($Ni_3S_2$) and 5 parts by mole to 40 parts by mole of lithium halide with respect to 100 parts by mole of a mixture of lithium sulfide ($Li_2S$) and diphosphorus pentasulfide ($P_2S_5$); (2) milling and amorphizing the starting material; and (3) heat-treating and crystallizing the amorphized starting material.

In a preferred embodiment, the mixture may include 60 mole % to 90 mole % of lithium sulfide and 10 mole % to 40 mole % of diphosphorus pentasulfide.

In another preferred embodiment, the lithium halide may be expressed by LiX (X is Cl, Br or I).

In still another preferred embodiment, step (3) may be a step of heat-treating the amorphized starting material at 200°

C. to 400° C. and crystallizing the heat-treated starting material to have a cubic crystal structure.

In yet another preferred embodiment, step (3) may be a step of heat-treating the amorphized starting material at 400° C. to 600° C. and crystallizing the heat-treated starting material to have a cubic crystal structure.

In still yet another preferred embodiment, the cubic crystal structure may have diffraction peaks in an area of diffraction angles 2θ of 15.5±0.5°, 18±0.5°, 25.5±0.5°, 30±0.5°, 31.5±0.5°, 40±0.5°, 45.5±0.5°, 48±0.5°, 53±0.5°, 55±0.5°, 56.5±0.5° and 59.5±0.5° in an X-ray diffraction spectrum.

The present invention includes the above configurations and thus can have the following effects.

According to embodiments of the present invention, the sulfide-based solid electrolyte can have high ion conductivity due to a crystal structure of a high ionic conductive phase in a wide temperature range even though a battery is driven in any environment.

Since the range of the crystallization temperature is wide, the sulfide-based solid electrolyte may be used suitably for changes in a manufacturing process and thus commercialization of the sulfide-based solid electrolyte can be accelerated.

The effects of the present invention are not limited to the aforementioned effects. It should be understood that the effects of the present invention include all effects inferable from the description below.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in detail through exemplary embodiments. The exemplary embodiments of the present invention may be modified in various forms as long as the gist of the invention is not changed. However, the scope of the present invention is not limited to the following exemplary embodiments.

When it is determined that the description for the known configurations and functions may obscure the gist of the present invention, the description for the known configurations and functions will be omitted. In this specification, the term "comprise" means that other constituent elements may be further included unless noted otherwise.

The present invention is a sulfide-based solid electrolyte including lithium sulfide (LLS), diphosphorus pentasulfide ($P_2S_3$), nickel sulfide ($Ni_3S_2$) and lithium halide (LiX) and characterized by forming a cubic crystal structure having high ion conductivity in a wide temperature range compared to a sulfide-based solid electrolyte in the related art at the time of heat-treating for crystallization.

A method of preparing a sulfide-based solid electrolyte according to the present invention includes (i) a step of preparing a starting material by adding 5 parts by mole to 20 parts by mole of nickel sulfide ($Ni_3S_2$) and 5 parts by mole to 40 parts by mole of lithium halide with respect to 100 parts by mole of a mixture of lithium sulfide ($Li_2S$) and diphosphorus pentasulfide ($P_2S_5$); (2) a step of milling and amorphizing the starting material; and (3) a step of heat-treating and crystallizing the amorphized starting material.

The lithium sulfide, diphosphorus pentasulfide, nickel sulfide and lithium halide are not particularly limited and may be industrially available or synthesized by a conventional method, and may use materials having high purity.

The mixture may include lithium sulfide of 60 mole % to 90 mole %, particularly 70 mole % to 80 mole %, and more particularly 75 mole % to 80 mole %, and diphosphorus pentasulfide of 10 mole % to 40 mole %, particularly 20 mole % to 30 mole %, and more particularly 20 mole % to 25 mole %.

According to the present invention, the sulfide-based solid electrolyte containing a nickel (Ni) element may be prepared by adding nickel sulfide to the mixture of lithium sulfide and diphosphorus pentasulfide in (1) the preparing of a starting material.

The sulfide-based solid electrolyte containing the nickel (Ni) element has high ion conductivity due to a crystal structure formed with nickel (Ni). The sulfide-based solid electrolyte has a specific crystal structure according to binding of respective elements and it is estimated that the lithium ions move by a hopping method through a gap in the crystal structure. Accordingly, as van der Waals radius of the element forming the gap in the crystal structure is decreased, it is advantageous in movement of lithium ions. The van der Waals radii of the elements mainly included in the sulfide-based solid electrolyte in the related art are as follows.

Phosphorus (180 pm), sulfur (180 pm), tin (217 pm), silicon (210 pm), arsenic (185 pm)

Meanwhile, since the van der Waals radius of nickel is 163 pm and very small compared to the above elements, when nickel is included in the crystal structure, the lithium ions may smoothly pass through the gap.

The sulfide-based solid electrolyte containing the nickel (Ni) element has excellent stability. This may be described according to a principle of hard and soft acids and bases (HSAB). Since sulfur (S) is a weak base and phosphorus (P) is a strong acid, sulfur (S) and phosphorus (P) are not stably bound to each other. As a result, when nickel (Ni) which is an intermediate acid with weaker acidity than phosphorus (P) is included in a crystal phase, nickel (Ni) has better reactivity than phosphorus (P) as a weak base and high stability during binding.

The nickel sulfide may be added with 5 parts by mole to 20 parts by mole, preferably 5 parts by mole to 15 parts by mole, and more preferably 5 parts by mole to 10 parts by mole with respect to 100 parts by mole of the mixture of lithium sulfide and diphosphorus pentasulfide. When the content of nickel sulfide is 5 parts by mole or more, ion conductivity and stability of the sulfide-based solid electrolyte may be improved as described above. Further, when the content of nickel sulfide is 20 parts by mole or less, nickel sulfide may be evenly distributed in the mixture and finally, the crystal structure of the sulfide-based solid electrolyte may be evenly formed.

According to the present invention, the sulfide-based solid electrolyte containing a nickel (Ni) element and a halogen element may be prepared by adding nickel sulfide and lithium halide to the mixture of lithium sulfide and diphosphorus pentasulfide in (1) the preparing of a starting material.

The lithium halide may be expressed by LiX (X is Cl, Br or I).

The lithium halide may be added with 5 parts by mole to 40 parts by mole with respect to 100 parts by mole of the mixture of lithium sulfide and diphosphorus pentasulfide. When the content of lithium halide is 5 parts by mole or more, a cubic crystal structure of a high ion conductive phase may be formed. However, when the content of lithium halide is more than 40 parts by mole, an orthorhombic crystal structure in which ion conductivity of the sulfide-based solid electrolyte is reduced at the time of hot heat treatment may be formed.

As such, a precursor (starting material) of the sulfide-based solid electrolyte is formed by adding the specific content of nickel sulfide and lithium halide to the mixture of lithium sulfide and diphosphorus pentasulfide to form a cubic crystal structure having high ion conductivity in a wide temperature range of 200° C. to 600° C. compared with the sulfide-based solid electrolyte in the related art at the time of heat treatment for crystallization of the starting material.

Step (2) is a step of milling and amorphizing the starting material.

The amorphizing may be performed by a method of wet milling of adding a solvent to the starting material and then milling the solvent or dry milling of milling the starting material without adding the solvent.

When the amorphizing is performed by wet milling, before step (3) to be described below, drying for removing the solvent may be further performed.

Step (3) is a step of heat-treating and crystallizing the amorphized starting material to have a specific crystal structure.

It is described earlier that the sulfide-based solid electrolyte in the related art is formed as a high ion conductive phase only in a specific temperature range of a low temperature of about 250° C. or a high temperature of about 500° C.

The sulfide-based solid electrolyte according to the present invention has a wide crystallization temperature to have a cubic crystal structure as a high ion conductive phase in the entire numerical range, at the time of heat treatment at 200° C. to 600° C.

Hereinafter, the present invention will be described in more detail through detailed Examples. However, these Examples are to exemplify the present invention and the scope of the present invention is not limited thereto.

EXAMPLES

The following examples illustrate the invention and are not intended to limit the same.

Comparative Example 1

After $80Li_2S-20P_2S_5$ as a sulfide-based solid electrolyte disclosed in Mizuno et al., high lithium ion conducting glass-ceramics in the system $Li_2S-P_2S_5$, *Solid State Ionics*, 177(2006), 2721-2725 was prepared by varying a crystallization temperature, ion conductivity was measured. The preparing method was as follows.

$Li_2S:P_2S_5$ was measured to be in a composition ratio of 80 mol:20 mol so as to prepare a mixture of 20 g. Xylene as a solvent was added to the mixture and then the mixture was milled by a planetary mill and amorphized. After the amorphizing is completed, the solvent was removed by vacuum drying and the mixture was crystallized by heat-treating under a condition of Table 1 below.

Each sulfide-based solid electrolyte was compressively molded by varying a heat-treatment temperature to form a molding body (a diameter of 13 mm) for measurement. An AC potential of 10 mV was applied to the molding body and then ion conductivity was measured by performing a frequency sweeping of $1\times10^6$ to 100 Hz. The result is illustrated in Table 1.

TABLE 1

| Classification | Heat-treatment (crystallization) condition | Ion conductivity [S/cm] |
| --- | --- | --- |
| $80Li_2S$—$20P_2S_5$ | 230° C., 2 hrs | $1.3 \times 10^{-3}$ |
| | 500° C., 4 hrs | $2.3 \times 10^{-6}$ |

Referring to Table 1, in the case of a sulfide-based solid electrolyte in Comparative Example 1, it can be seen that high ion conductivity of $10^{-3}$ S/cm or more is observed at a low crystallization temperature of 230° C., whereas ion conductivity is very low at a high crystallization temperature of 500° C.

Comparative Example 2

$Li_6PS_5Cl$ as a sulfide-based solid electrolyte disclosed in Korean Patent Application Publication No. 10-2015-0132265 was prepared by varying a crystallization temperature and then ion conductivity was measured. The preparing method was as follows.

A lithium sulfide powder, a diphosphorus pentasulfide powder, and a lithium chloride (LiCl) powder were measured according to a composition of $Li_6PS_5Cl$ to prepare a mixture of 5 g. Xylene as a solvent was added to the mixture, and then the mixture was milled by a planetary mill and amorphized. After the amorphizing is completed, the solvent was removed by vacuum drying and the mixture was crystallized by heat-treating under a condition of Table 2 below.

Ion conductivity was measured by the same method as Comparative Example 1. The result is illustrated in Table 2 below.

TABLE 2

| Classification | Heat-treatment (crystallization) condition | Ion conductivity [S/cm] |
| --- | --- | --- |
| $Li_6PS_5Cl$ | 230° C., 2 hrs | $4.31 \times 10^{-4}$ |
| | 500° C., 4 hrs | $1.81 \times 10^{-3}$ |

Referring to Table 2, in the case of a sulfide-based solid electrolyte in Comparative Example 2, it can be seen that high ion conductivity of $10^{-3}$ S/cm or more is observed at a high crystallization temperature of 500° C., whereas ion conductivity is slightly low at a low crystallization temperature of 230° C.

Examples 1 to 4

(Example 1) 6.85 g of lithium sulfide ($Li_2S$), 8.28 g of diphosphorus pentasulfide ($P_2S_5$), 4.48 g of nickel sulfide ($Ni_3S_2$), and 0.39 g of lithium chloride (LiCl) were measured and mixed to be Chemical Formula of Table 3 to prepare 20 g of a starting material.

To the starting material, 165 g of xylene as a solvent was added and then milled by a planetary ball mill and amorphized. Thereafter, the solvent was removed by vacuum drying under conditions of about 160° C. and 2 hrs.

The amorphized starting material was crystallized by heat-treating under conditions of about 260° C. and 2 hrs to obtain the sulfide-based solid electrolyte.

(Example 2) Except that 6.72 g of lithium sulfide ($Li_2S$), 8.12 g of diphosphorus pentasulfide ($P_2S_5$), 4.39 g of nickel sulfide ($Ni_3S_2$), and 0.77 g of lithium chloride (LiCl) were measured and mixed to be Chemical Formula of Table 3 to prepare 20 g of a starting material, a sulfide-based solid electrolyte was obtained by the same method as Example 1.

(Example 3) Except that 6.47 g of lithium sulfide ($Li_2S$), 7.82 g of diphosphorus pentasulfide ($P_2S_5$), 4.22 g of nickel sulfide ($Ni_3S_2$), and 1.49 g of lithium chloride (LiCl) were measured and mixed to be Chemical Formula of Table 3 to prepare 20 g of a starting material, a sulfide-based solid electrolyte was obtained by the same method as Example 1.

(Example 4) Except that 6.02 g of lithium sulfide ($Li_2S$), 7.28 g of diphosphorus pentasulfide ($P_2S_5$), 3.93 g of nickel sulfide ($Ni_3S_2$), and 2.77 g of lithium chloride (LiCl) were measured and mixed to be Chemical Formula of Table 3 to prepare 20 g of a starting material, a sulfide-based solid electrolyte was obtained by the same method as Example 1.

Examples 5 to 8

(Example 5) Except for heat-treating and crystallizing the amorphized starting material under conditions of 500° C. and 4 hrs, a sulfide-based solid electrolyte was obtained by the same method as Example 1.

(Example 6) Except for heat-treating and crystallizing the amorphized starting material under conditions of 500° C. and 4 hrs, a sulfide-based solid electrolyte was obtained by the same method as Example 2.

(Example 7) Except for heat-treating and crystallizing the amorphized starting material under conditions of 500° C. and 4 hrs, a sulfide-based solid electrolyte was obtained by the same method as Example 3.

(Example 8) Except for heat-treating and crystallizing the amorphized starting material under conditions of 500° C. and 4 hrs, a sulfide-based solid electrolyte was obtained by the same method as Example 4.

Compositions and crystallization conditions in Examples 1 to 8 are illustrated in Table 3 below.

TABLE 3

| Classification | Chemical Formula | Crystallization condition |
| --- | --- | --- |
| Example 1 | $80Li_2S \cdot 20P_2S_5 \cdot 10Ni_3S_2 \cdot 5LiCl$ | 260° C./2 hrs |
| Example 2 | $80Li_2S \cdot 20P_2S_5 \cdot 10Ni_3S_2 \cdot 10LiCl$ | |
| Example 3 | $80Li_2S \cdot 20P_2S_5 \cdot 10Ni_3S_2 \cdot 20LiCl$ | |
| Example 4 | $80Li_2S \cdot 20P_2S_5 \cdot 10Ni_3S_2 \cdot 40LiCl$ | |
| Example 5 | $80Li_2S \cdot 20P_2S_5 \cdot 10Ni_3S_2 \cdot 5LiCl$ | 500° C./4 hrs |
| Example 6 | $80Li_2S \cdot 20P_2S_5 \cdot 10Ni_3S_2 \cdot 10LiCl$ | |
| Example 7 | $80Li_2S \cdot 20P_2S_5 \cdot 10Ni_3S_2 \cdot 20LiCl$ | |
| Example 8 | $80Li_2S \cdot 20P_2S_5 \cdot 10Ni_3S_2 \cdot 40LiCl$ | |

Example 9

Except that 5.25 g of lithium sulfide ($Li_2S$), 6.35 g of diphosphorus pentasulfide ($P_2S_5$), 3.43 g of nickel sulfide ($Ni_3S_2$), and 4.96 g of lithium bromide (LiBr) were measured and mixed to be Chemical Formula of $80Li_2S$-$20P_2S_5$-$10Ni_3S_2$-$40LiBr$ to prepare 20 g of a starting material, a sulfide-based solid electrolyte was obtained by the same method as Example 1.

Example 10

Except that 4.63 g of lithium sulfide ($Li_2S$), 5.60 g of diphosphorus pentasulfide ($P_2S_5$), 3.3 g of nickel sulfide ($Ni_3S_2$), and 6.74 g of lithium iodide (LiI) were measured and mixed to be Chemical Formula of $80Li_2S$-$20P_2S_5$-

10Ni$_3$S$_2$-40LiI to prepare 20 g of a starting material, a sulfide-based solid electrolyte was obtained by the same method as Example 1.

TEST EXAMPLES

Test Example 1

Ion conductivities of the sulfide-based solid electrolytes in Examples 1 to 8 were measured. Each sulfide-based solid electrolyte was compressively molded to form a molding body (a diameter of 13 mm) for measurement. An AC potential of 10 mV was applied to the molding body and then an impedance value was measured by performing a frequency sweeping of 1×10$^6$ to 100 Hz to obtain ion conductivity.

Figure 1:
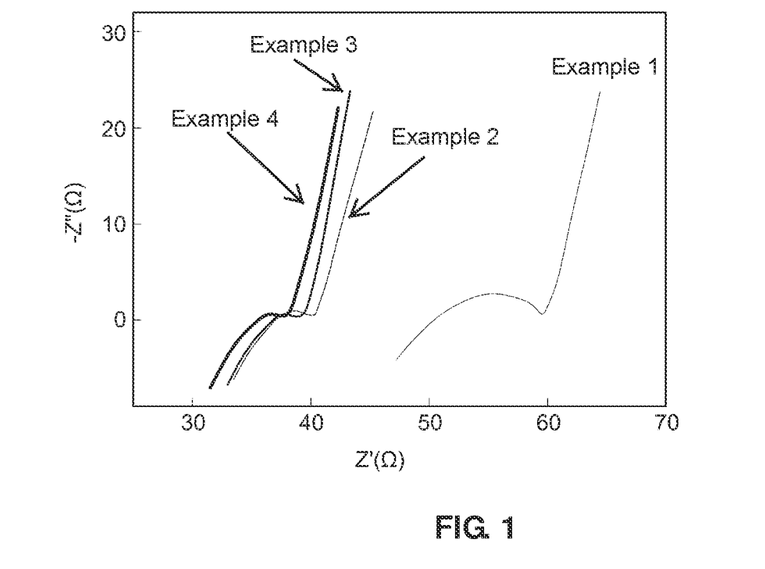
FIG. 1 is a result of measuring impedance values for sulfide-based solid electrolytes in Examples 1 to 4 of the present invention.

FIG. 1 is a result of measuring impedance values for the sulfide-based solid electrolytes in Examples 1 to 4 of the present invention.

Figure 2:
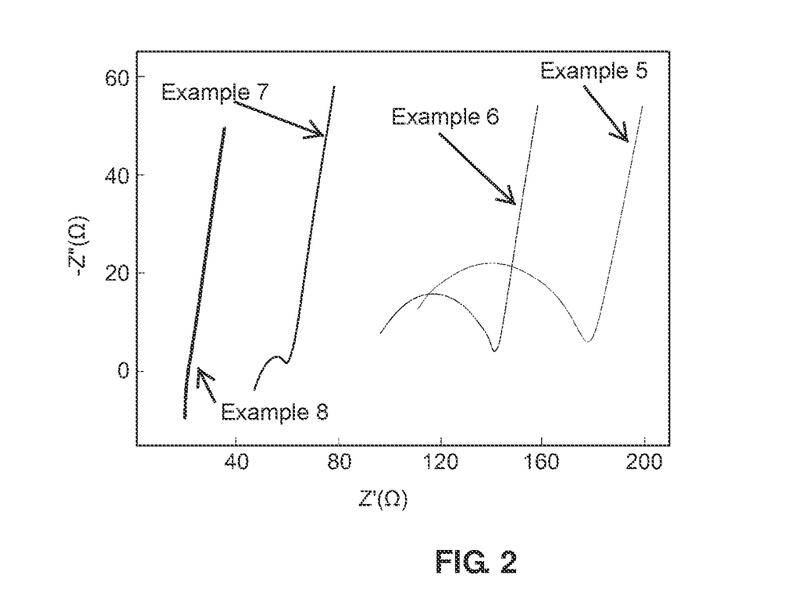
FIG. 2 is a result of measuring impedance values for sulfide-based solid electrolytes in Examples 5 to 8 of the present invention.

FIG. 2 is a result of measuring impedance values for the sulfide-based solid electrolytes in Examples 5 to 8 of the present invention.

Table 4 below is a result of measuring ion conductivities for the sulfide-based solid electrolytes in Examples 1 to 8 of the present invention.

TABLE 4

| Classification | Ion conductivity [S/cm] |
| --- | --- |
| Example 1 | 7.00 × 10$^{-4}$ |
| Example 2 | 1.3 × 10$^{-3}$ |
| Example 3 | 1.6 × 10$^{-3}$ |
| Example 4 | 1.9 × 10$^{-3}$ |
| Example 5 | 2.33 × 10$^{-4}$ |
| Example 6 | 2.93 × 10$^{-4}$ |
| Example 7 | 6.88 × 10$^{-4}$ |
| Example 8 | 2.7 × 10$^{-3}$ |

Referring to FIGS. 1 and 2, it can be seen that ion conductivity is increased as the content of halogen element in the sulfide-based solid electrolyte is increased. Further, referring to FIG. 2, in the case of crystallization at a high temperature of 500° C., it can be verified that an interface resistance is decreased as the content of halogen element is increased.

Referring to Table 4, it can be seen that the sulfide-based solid electrolyte according to the present invention has ion conductivity of 10$^{-4}$ S/cm or more in a wide crystallization temperature range. Particularly, it can be verified that Examples 4 and 8 containing 40 parts by mole of lithium halide have very high ion conductivity of 10$^{-3}$ S/cm or more.

Test Example 2

With respect to the sulfide-based solid electrolytes in Examples 4 and 8, an X-ray diffraction spectroscopy (XRD) was performed.

Figure 3:
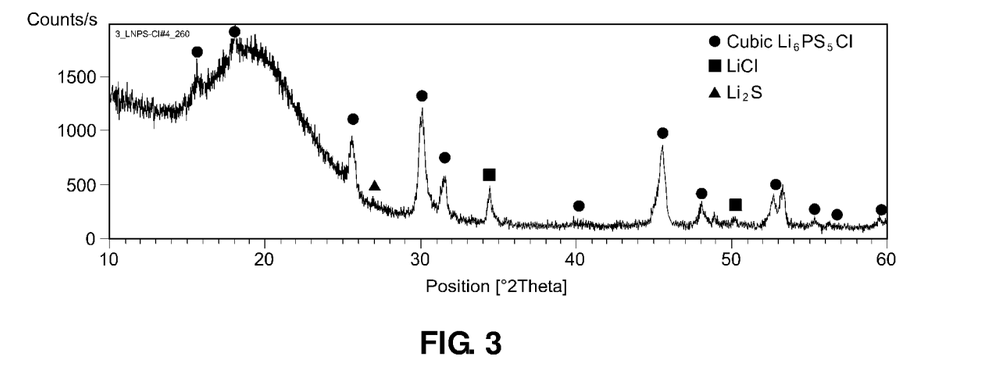
FIG. 3 is an X-ray diffraction spectroscopy (XRD) result for the sulfide-based solid electrolyte in Example 4 of the present invention.
Figure 4:
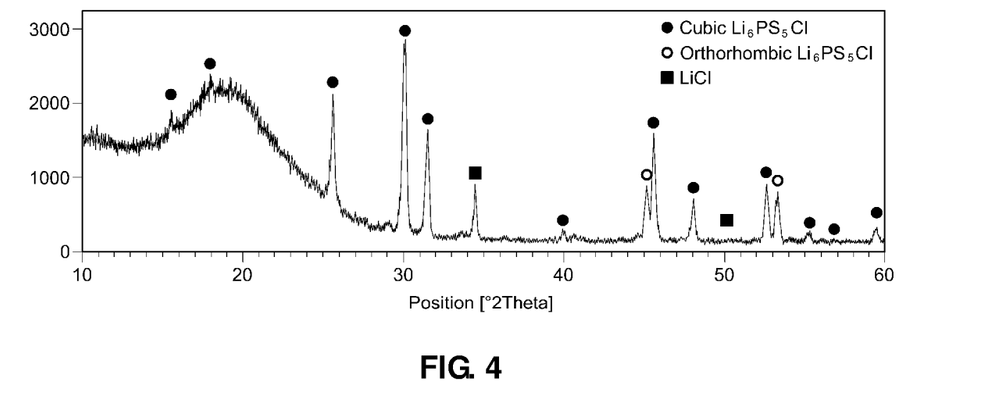
FIG. 4 is an XRD result for the sulfide-based solid electrolyte in Example 8 of the present invention.

FIG. 3 is an XRD result for the sulfide-based solid electrolyte in Example 4 and FIG. 4 is an XRD result for the sulfide-based solid electrolyte in Example 8.

Referring to FIG. 3, it can be seen that the sulfide-based solid electrolyte in Example 4 has diffraction peaks in regions having diffraction angles 2θ of 15.5±0.5°, 18±0.5°, 25.5±0.5°, 30±0.5°, 31.5±0.5°, 40±0.5°, 45.5±0.5°, 48±0.5°, 53±0.5°, 55±0.5°, 56.5±0.5° and 59.5±0.5° as main peaks, and it can be seen that since the peaks are substantially the same peaks as Li$_6$PS$_5$Cl having high ion conductivity, the sulfide-based solid electrolyte of Example 4 has a high ion conductive cubic crystal structure.

Referring to FIG. 4, it can be seen that since the sulfide-based solid electrolyte in Example 8 also has substantially the same peaks as Li$_6$PS$_5$Cl as main peaks, the sulfide-based solid electrolyte of Example 8 has a high ion conductive cubic crystal structure.

As a result, it can be seen that the sulfide-based solid electrolyte according to the present invention has a high ion conductive cubic crystal structure in a wide crystallization temperature range and it supports the result of Test Example 1.

Test Example 3

Charge and discharge capacities of an all solid-state batteries adopting the sulfide-based solid electrolytes in Examples 1 to 8 were measured.

The all solid-state battery was constituted by a positive electrode, a negative electrode, and a solid electrolyte layer interposed between the positive electrode and the negative electrode. The solid electrolyte layer was formed with a thickness of 500 μm in by compressively molding the sulfide-based solid electrolytes in Examples 1 to 8, and as the positive electrode, a powder containing an active material (Nb-coated NCM622), a solid electrolyte (a solid electrolyte used in the solid electrolyte layer), and a conductive material (Super C) was formed on the solid electrolyte layer with an active material loading amount of 5.8 mg/cm$^2$ and a thickness of 30 μm, and as the negative electrode, indium foil with a thickness of 100 μm was used.

With respect to the all solid-state battery, a discharge capacity was measured by performing charging and discharging under a constant current (CC) condition in a range of 2 V to 3.58 V at rate limiting of 0.02 C rate.

Figure 5:
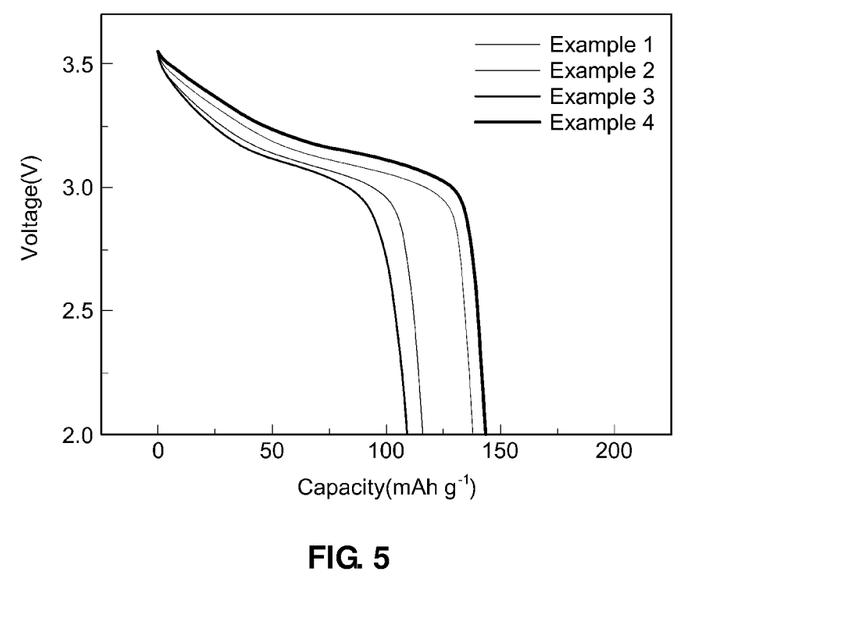
FIG. 5 is a result of measuring discharge capacities of all solid-state batteries adopting the sulfide-based solid electrolytes in Examples 1 to 4 of the present invention.
Figure 6:
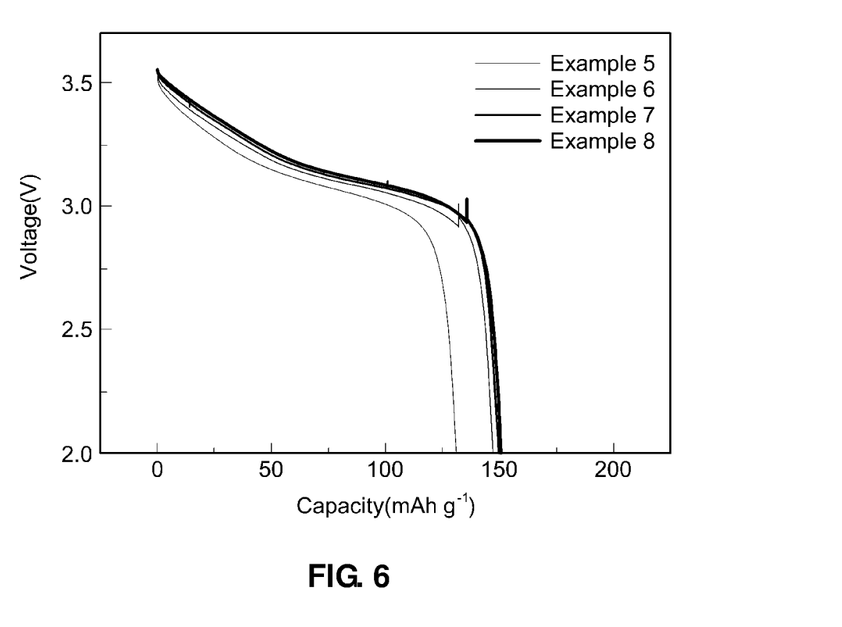
FIG. 6 is a result of measuring discharge capacities of all solid-state batteries adopting the sulfide-based solid electrolytes in Examples 5 to 8 of the present invention.

FIG. 5 is a result of measuring charge and discharge capacities of all solid-state batteries adopting the sulfide-based solid electrolytes in Examples 1 to 4 of the present invention and FIG. 6 is a result of measuring charge and discharge capacities of all solid-state batteries adopting the sulfide-based solid electrolytes in Examples 5 to 8 of the present invention. The charge and discharge capacities are numerically illustrated in Table 5.

TABLE 5

| Classification | Charge [mAh/g] | Discharge [mAh/g] |
| --- | --- | --- |
| Example 1 | 185 | 137 |
| Example 2 | 166 | 115 |
| Example 3 | 153 | 109 |
| Example 4 | 182 | 143 |
| Example 5 | 197 | 131 |
| Example 6 | 221 | 147 |
| Example 7 | 250 | 149 |
| Example 8 | 218 | 150 |

Referring to FIGS. 5 and 6 and Table 5, it can be verified that the all solid-state batteries adopting the sulfide-based solid electrolytes in Examples 1 to 8 have excellent charge and discharge capacities of about 150 mAh/g.

Test Example 4

Ion conductivities for the sulfide-based solid electrolytes in Examples 9 and 10 were measured by the same method as Test Example 1. The result is illustrated in Table 6.

TABLE 6

| Classification | Chemical Formula | Ion conductivity [S/cm] |
|---|---|---|
| Example 4 | $80Li_2S \cdot 20P_2S_5 \cdot 10Ni_3S_2 \cdot 40LiCl$ | $1.9 \times 10^{-3}$ |
| Example 9 | $80Li_2S \cdot 20P_2S_5 \cdot 10Ni_3S_2 \cdot 40LiBr$ | $5.10 \times 10^{-4}$ |
| Example 10 | $80Li_2S \cdot 20P_2S_5 \cdot 10Ni_3S_2 \cdot 40LiI$ | $3.00 \times 10^{-4}$ |

Referring to Table 6, it can be seen that even in the case of using lithium bromide and lithium iodide instead of lithium chloride as the lithium halide, the sulfide-based solid electrolyte having high ion conductivity which has excellent ion conductivity of $1.0 \times 10^{-4}$ S/cm or more can be synthesized.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A sulfide-based solid electrolyte comprising starting materials comprising:
   5 parts by mole to 20 parts by mole of nickel sulfide ($Ni_3S_2$) and 5 parts by mole to 40 parts by mole of lithium halide with respect to 100 parts by mole of a mixture of lithium sulfide ($Li_2S$) and diphosphorus pentasulfide ($P_2S_5$);
   wherein a crystallization temperature of the sulfide-based solid electrolyte is 200° C. to 260° C. or 400° C. to 600° C.; and
   wherein the sulfide-based solid electrolyte has a cubic crystal structure having diffraction peaks in an area of diffraction angles 2θ of 15.5±0.5°, 18±0.5°, 25.5±0.5°, 30±0.5°, 31.5±0.5°, 40±0.5°, 45.5±0.5°, 48±0.5°, 53±0.5°, 55±0.5°, 56.5±0.5° and 59.5±0.5° in an X-ray diffraction spectrum.

2. The sulfide-based solid electrolyte of claim 1, wherein the mixture comprises:
   60 mole % to 90 mole % of the lithium sulfide; and
   10 mole % to 40 mole % of diphosphorus pentasulfide.

3. The sulfide-based solid electrolyte of claim 1, wherein the mixture comprises 60 mole % to 90 mole % of the lithium sulfide.

4. The sulfide-based solid electrolyte of claim 1, wherein the mixture comprises 10 mole % to 40 mole % of diphosphorus pentasulfide.

5. The sulfide-based solid electrolyte of claim 1, wherein the lithium halide is expressed by LiX, where X is Cl.

6. The sulfide-based solid electrolyte of claim 1, wherein the lithium halide is expressed by LiX, where X is Br.

7. The sulfide-based solid electrolyte of claim 1, wherein the lithium halide is expressed by LiX, where X is I.

8. The sulfide-based solid electrolyte of claim 1, wherein a crystallization temperature of the sulfide-based solid electrolyte is 200° C. to 260° C.

9. The sulfide-based solid electrolyte of claim 1, wherein a crystallization temperature of the sulfide-based solid electrolyte is 400° C. to 600° C.

10. The sulfide-based solid electrolyte of claim 1, wherein the sulfide-based solid electrolyte has high ion conductivity in a wide crystallization temperature range.

11. A sulfide-based solid electrolyte comprising starting materials comprising:
   5 parts by mole to 20 parts by mole of nickel sulfide ($Ni_3S_2$) and 5 parts by mole to 40 parts by mole of lithium halide with respect to 100 parts by mole of a mixture of lithium sulfide ($Li_2S$) and diphosphorus pentasulfide ($P_2S_5$);
   wherein a crystallization temperature of the sulfide-based solid electrolyte is 200° C. to 260° C. or 400° C. to 600° C.;
   wherein the sulfide-based solid electrolyte has a cubic crystal structure having diffraction peaks in an area of diffraction angles 2θ of 15.5±0.5°, 18±0.5°, 25.5±0.5°, 30±0.5°, 31.5±0.5°, 40±0.5°, 45.5±0.5°, 48±0.5°, 53±0.5°, 55±0.5°, 56.5±0.5° and 59.5±0.5° in an X-ray diffraction spectrum;
   wherein the mixture comprises 60 mole % to 90 mole % of the lithium sulfide and 10 mole % to 40 mole % of diphosphorus pentasulfide; and
   wherein the lithium halide is expressed by LiX, where X is Cl, Br or I.

12. The sulfide-based solid electrolyte of claim 11, wherein the lithium halide is expressed by LiX, where X is Cl.

13. The sulfide-based solid electrolyte of claim 11, wherein the lithium halide is expressed by LiX, where X is Br.

14. The sulfide-based solid electrolyte of claim 11, wherein the lithium halide is expressed by LiX, where X is I.

15. The sulfide-based solid electrolyte of claim 11, wherein the sulfide-based solid electrolyte has high ion conductivity in a wide crystallization temperature range.

16. A sulfide-based solid electrolyte comprising starting materials comprising:
   5 parts by mole to 20 parts by mole of nickel sulfide ($Ni_3S_2$); and 5 parts by mole to 40 parts by mole of lithium halide with respect to 100 parts by mole of a mixture of lithium sulfide ($Li_2S$) and diphosphorus pentasulfide ($P_2S_5$);
   wherein the sulfide-based solid electrolyte has a cubic crystal structure having diffraction peaks in an area of diffraction angles 2θ of 15.5±0.5°, 18±0.5°, 25.5±0.5°, 30±0.5°, 31.5±0.5°, 40±0.5°, 45.5±0.5°, 48±0.5°, 53±0.5°, 55±0.5°, 56.5±0.5° and 59.5±0.5° in an X-ray diffraction spectrum.

17. The sulfide-based solid electrolyte of claim 16, wherein the mixture comprises
   60 mole % to 90 mole % of the lithium sulfide; and
   10 mole % to 40 mole % of diphosphorus pentasulfide.

18. The sulfide-based solid electrolyte of claim 16, wherein the lithium halide is expressed by LiX, where X is Cl, Br or I.

19. The sulfide-based solid electrolyte of claim 16, wherein a crystallization temperature of the sulfide-based solid electrolyte is 200° C. to 260° C.

20. The sulfide-based solid electrolyte of claim 16, wherein a crystallization temperature of the sulfide-based solid electrolyte is 400° C. to 600° C.

* * * * *